(12) United States Patent
Mote, Jr.

(10) Patent No.: US 12,022,782 B2
(45) Date of Patent: Jul. 2, 2024

(54) SYSTEM FOR WARNING OF EXCESS WATER SATURATION OF A ROOT BALL

(71) Applicant: John Mote, Jr., Montrose, CA (US)

(72) Inventor: John Mote, Jr., Montrose, CA (US)

(*) Notice: Subject to any disclaimer, the term of this patent is extended or adjusted under 35 U.S.C. 154(b) by 225 days.

(21) Appl. No.: 17/182,079

(22) Filed: Feb. 22, 2021

(65) Prior Publication Data

US 2022/0264811 A1  Aug. 25, 2022

(51) Int. Cl.
*A01G 25/16*   (2006.01)
*A01G 25/06*   (2006.01)
*G08B 21/18*   (2006.01)

(52) U.S. Cl.
CPC ......... *A01G 25/167* (2013.01); *A01G 25/06* (2013.01); *G08B 21/182* (2013.01)

(58) Field of Classification Search
CPC ..... A01G 25/167; A01G 25/06; G08B 21/182
See application file for complete search history.

(56) References Cited

U.S. PATENT DOCUMENTS

| | | | |
|---|---|---|---|
| 585,856 A * | 7/1897 | Swanson ........... | A01G 25/06 405/37 |
| 2,817,956 A * | 12/1957 | Frederick .......... | A01G 25/06 47/1.01 R |
| 3,189,226 A | 6/1965 | Sherbondy | |
| 3,204,872 A * | 9/1965 | Whear ............. | A01G 25/167 340/602 |
| 3,407,608 A * | 10/1968 | Whitehead ........ | A01G 25/06 405/37 |
| 3,408,818 A * | 11/1968 | Hemphill .......... | A01G 25/06 405/44 |
| 3,443,385 A * | 5/1969 | Vollmer ........... | A01G 25/06 205/730 |
| 3,790,306 A | 2/1974 | Uefuji | |
| 4,060,991 A * | 12/1977 | Reese .............. | A01G 25/06 405/36 |
| 4,156,324 A * | 5/1979 | Henttonen ........ | A01G 25/00 405/43 |
| 4,158,441 A * | 6/1979 | Stan ................ | A01G 25/167 239/70 |
| 4,546,571 A * | 10/1985 | Scrivens .......... | A01G 27/04 47/64 |
| 4,757,305 A | 7/1988 | Peso | |
| 4,771,572 A * | 9/1988 | Higa ............... | A01G 25/06 47/DIG. 10 |
| 4,878,780 A * | 11/1989 | Vidal .............. | E01C 13/02 405/38 |
| 4,879,545 A | 11/1989 | Aguilar | |
| 5,269,184 A * | 12/1993 | Nishida ........... | G01F 23/30 73/322 |
| 5,570,715 A | 11/1996 | Featheringill et al. | |
| 5,613,835 A | 3/1997 | Tyner | |

(Continued)

*Primary Examiner* — Monica L Perry
*Assistant Examiner* — Aaron M Rodziwicz
(74) *Attorney, Agent, or Firm* — Trojan Law Offices (57) ABSTRACT

A system for warning of excess water saturation of a root ball includes a lateral network of perforated tubing located below the root ball in a planting pit, connected to vertical tubing containing a shaft and bladder, the shaft's height indicating the water level within the soil of the planting pit. The system may indicate the historical water level and the real-time water level. The system may also contain a sump and may be configured to measure and calculate the percolation rate of the soil.

6 Claims, 6 Drawing Sheets

(56) References Cited

U.S. PATENT DOCUMENTS

| | | | | |
|---|---|---|---|---|
| 5,644,868 | A * | 7/1997 | Lui | A01G 27/06 47/79 |
| 6,148,852 | A | 11/2000 | Osterman | |
| 6,237,283 | B1 * | 5/2001 | Nalbandian | A01G 27/006 47/79 |
| 6,601,440 | B1 * | 8/2003 | Chuang | A01G 25/167 73/73 |
| 6,763,780 | B2 | 7/2004 | Place | |
| 7,417,552 | B1 | 8/2008 | Vaskovic | |
| 7,748,270 | B2 | 7/2010 | McQuaid | |
| 8,256,455 | B1 | 9/2012 | Ball | |
| 8,319,124 | B1 * | 11/2012 | Wang | G01F 23/0007 200/84 R |
| 8,500,412 | B2 | 8/2013 | Williams et al. | |
| 8,956,126 | B2 | 2/2015 | Sernaker | |
| 9,576,463 | B2 | 2/2017 | Walbert | |
| 10,219,453 | B2 * | 3/2019 | Funk | A01G 29/00 |
| 10,945,387 | B2 * | 3/2021 | Zhao | A01G 27/06 |
| 2004/0005193 | A1 * | 1/2004 | Mazzei | A01G 25/06 405/36 |
| 2010/0064581 | A1 * | 3/2010 | Johnson | A01G 27/008 47/79 |
| 2010/0296870 | A1 * | 11/2010 | Ono | A01G 25/06 405/39 |
| 2011/0058900 | A1 * | 3/2011 | Furukawa | A01G 25/06 405/43 |
| 2013/0111988 | A1 | 5/2013 | Newton | |
| 2014/0161629 | A1 | 6/2014 | Fleischmann | |
| 2017/0107706 | A1 | 4/2017 | Schwartz et al. | |
| 2018/0153112 | A1 * | 6/2018 | Li | A01G 27/003 |
| 2022/0232759 | A1 * | 7/2022 | Sauder | A01C 23/042 |

* cited by examiner

SYSTEM FOR WARNING OF EXCESS WATER SATURATION OF A ROOT BALL

FIELD OF THE INVENTION

This application relates to a System for Warning of Excess Water Saturation of a Root Ball ("Warning System"). The Warning System can indicate real-time and historical water levels of a soil. The Warning System can also calculate a water percolation rate for a soil.

BACKGROUND OF THE INVENTION

Water is essential to life, but too much can be fatal. For plants, excess water in the soil can create anaerobic soil conditions that damage and kill many plant species. Anaerobic soil conditions refer to conditions in which a soil or a substrate has little to no available oxygen because airflow within the soil pores is restricted. Anaerobic soil conditions caused by water saturation can occur from excess rain and over-irrigation. Certain soils, such as heavy clay soils in which pore space is limited, can also be particularly prone to anaerobic conditions. When oxygen is absent from the space where the roots and soil meet, nutrients and lack of oxygen become limiting factors to continued plant life.

Oxygen is a necessary component in many plant processes including respiration and nutrient movement from the soil to the roots. Oxygen moves slowly and passively through plants by a process known as diffusion. Without oxygen, plant root growth stops and, over time, the roots begin to die. Over a prolonged period of time, root dieback can become significant. The stromata will begin to close and photosynthesis will be reduced. As plant respiration continues while photosynthesis slows down, the plant enters a biological decline. This biological decline of the plant leads to reduced yields, root and limb dieback, greater susceptibility to disease and pests, and death of the plant.

Additionally, as anaerobic conditions increase in the soil, anaerobic organisms begin to replace aerobic organisms that rely on oxygen in the soil to survive. Anaerobic bacteria cause roots to rot faster and reduce the minerals available within the soil, such as iron and sulfur. Wet conditions can also encourage the growth of harmful fungi that feed off of and can kill the plant roots.

In the case of transplanting trees, anaerobic conditions can occur when the root ball is submerged in water because the soil is saturated because of poor drainage. If the bottom of the root ball is sitting in water, the root ball can suffer from the aforementioned consequences of anaerobic conditions leading to the biological decline and death of the tree. There needs to be enough water in the soil to sustain the growth of the tree without creating an anaerobic environment leading to root rot, decline, and death.

Thus, there is a need for Warning System that can indicate the historically highest water level of a soil sustaining a tree. There is also a need for a Warning System that can indicate a real-time water level of a soil sustaining a tree. There is further a need for a Warning System that can measure the liquid percolation rate of a soil. There is further a need for a Warning System that can calculate the liquid percolation rate of a soil. And there is a need for a method to customize a Warning System to be adapted to and fit various soil conditions.

SUMMARY OF THE INVENTION

The systems and techniques disclosed herein feature a Warning System for indicating the water saturation and/or water level of a soil. The Warning System can indicate a historical water level of the soil. The Warning System can also indicate a real-time water level of the soil.

In one aspect, the systems and techniques disclosed here feature a Warning System comprising a water monitoring system for monitoring the water level of a soil. The soil can, for example, be a soil within a planting pit for growing a plant such as a tree. The Warning System can have a network of perforated tubing adjacent to a bottom surface of the planting pit housing the soil. The Warning System can also have a vertical pipe associated with the network of perforated tubing. The Warning System can have a bladder housed within the vertical pipe and a shaft attached to the bladder. The bladder can be buoyant.

Implementations may include one or more of the following features.

One feature may be a vertical pipe cap with a cavity adapted to fit the shaft through.

Another feature may be a fastener adapted to prevent the shaft from descending below the vertical pipe cap. For example, the fastener can prevent a top end of the shaft from moving down a cavity of the vertical pipe cap and the entire shaft descending below the vertical pipe cap.

Another feature may be the configuration of the Warning System. For example, the network of perforated tubing can be configured to collect water from the soil. Water within the soil can be collected by the network of perforated tubing. Water within the soil can be collected by the vertical pipe. Water collected by the network of perforated tubing and other piping can be associated with other associated tubing and piping. For example, water collected by the network of perforated tubing can be associated with other piping such as the vertical pipe associated with the network of perforated tubing. The bladder can float on top of the surface of the water collected by the tubing and the piping. For example, the bladder can float on top of the surface of water within the vertical pipe that was collected by the associated network of perforated tubing. The shaft can indicate a water level of the water collected by the network of perforated tubing. For example, the shaft can visually indicate a water level height of the water collected by the tubing and the piping by moving with the attached bladder floating on top of the surface of the collected water.

Another feature may be a retention mechanism for controlling the vertical movement of the shaft. The retention mechanism can be engaged, for example, with the shaft. The engaged retention mechanism can allow the shaft to move in an upwards vertical direction. The engaged retention mechanism can also prevent the shaft from moving in a downwards vertical direction. The retention mechanism can also be disengaged, for example, from the shaft. When the retention mechanism is disengaged, the shaft can move freely along a vertical plane. For example, the shaft can move upwards in a vertical direction and the shaft can move downwards in a vertical direction without being affected by the retention mechanism.

As an example, the shaft can indicate a historical water level of the soil when the retention mechanism is engaged. For example, when the retention mechanism is engaged with the shaft, the shaft can move in an upward vertical direction but can also be restricted by the retention mechanism from moving in a downward vertical direction. Thus, the height of the shaft can indicate the highest water level the soil has historically encountered because the shaft moves up with the water level but not down. In another example, the shaft can indicate a real-time water level of the soil when the retention mechanism is disengaged. For example, when the retention mechanism is disengaged from the shaft, the shaft can move in a vertical upward direction and a vertical downward direction. When the retention mechanism is disengaged, the movement of the shaft is not restricted by the retention mechanism. Thus, the height of the shaft can indicate the real-time water level of the soil because the shaft can move up and down with the water level.

Another feature may be a sump that can collect liquids such as excess water in the soil. For example, the sump can be associated with the network of perforated tubing. The sump can also be associated with the vertical pipe. The sump can also provide a means for accessing excess water. The sump can also provide a means for draining and/or removing excess water. For example, when the soil is saturated with water and the excess water is collected by the network of perforated tubing and its associated piping, the excess water can be drained through the vertical pipe and the sump. In another example, when the soil is saturated with water and the excess water is collected by the network of perforated tubing and its associated piping, the excess water can be pumped out through the vertical pipe and the sump Excess water can also be drained from embodiments with or without the sump through the vertical pipe.

Another feature may be the configuration of the fastener. For example, the fastener can be a nut and can be attached to the top end of the shaft. The fastener can also include other configurations that prevent the shaft from descending below the vertical pipe cap through the cavity on the vertical pipe cap. As an example, the fastener can be a ring or cap.

Another feature may be the configuration of the network of perforated tubing. For example, the network of perforated tubing can have a meshed surface covering. The meshed surface covering can allow liquids such as water to move through the perforations of the tubing network and enter the tubing network and prevent other materials such as solids like soil or rocks from moving through the perforations of the tubing network and entering the tubing network.

Another feature may be the configuration of the retention mechanism. For example, the retention mechanism can compromise a retention clip. The retention mechanism can further compromise a spring. Alternatively, the retention mechanism can compromise a ratchet and a pawl.

Another feature may be an alarm. The alarm can be an alarm for a specific water level height identified by the Warning System. For example, the alarm can be activated when the water level raises the shaft attached to the bladder to an alarm point. A part of the shaft, such as the top end of the shaft, can activate the alarm. The alarm can be activated in multiple ways. For example, a circuit can be completed by the contact created by the shaft, thus activating the alarm. The shaft can also establish a communication between an emitter and a detector, thus activating the alarm. The shaft can also interact with an infrared relay sensor, thus activating the alarm. The shaft can also actuate a device such as a button or a switch, thus activating the alarm.

Another feature may be computer technologies incorporated with the Warning System. For example, the Warning System can include a controller and a transmitter. The controller and transmitter can be part of a Warning System computing device. The transmitter can be capable of communicating with a receiver, and the receiver can be capable of receiving a data from the transmitter. For example, the data can include movement of water levels within the Warning System, water levels within the sump, water levels within the network of perforated tubing and its associated piping, movement of the bladder, movement of the shaft, and activation of the alarm. The receiver and/or Warning System computing device can be connected to and/or in communication with a computer network. The receiver and/or Warning System computing device can also be connected to and/or in communication with a cloud computer network. The cloud computer network can include on-demand availability of computer system resources such as a data storage, computer calculations, and computing power.

In another aspect, the systems and techniques disclosed here feature a method for customizing a Warning System such as a water monitoring system for monitoring water saturation of a soil.

Implementations may include one or more of the following features.

For example, a method for customizing a Warning System can include installing a network of perforated tubing along a bottom surface of a planting pit housing the soil. The method can include installing a vertical pipe with a vertical pipe cap to be associated with the network of perforated tubing, and installing a shaft attached to a bladder within the vertical pipe. The method can further include disengaging a retention mechanism within the vertical pipe cap and marking a first point on the shaft indicating the length from the top of the vertical pipe cap to a desired position of the bladder when there is no water in the vertical pipe. The method can also include installing a fastener attached to the shaft.

One feature of the method may include severing the shaft at a second point below the first point, installing the fastener at a point adjacent to the second point, and choosing a mode of operation for the Warning System. A historical water level monitoring mode of operation can be chosen. A real-time water level monitoring mode of operation can also be chosen. For example, a historical water level monitoring mode of operation can be chosen by engaging the retention mechanism with the shaft, thus allowing the shaft to move in an upward direction but restricting the shaft from moving in a downward direction. A real-time water level monitoring mode of operation can be chosen by disengaging the retention mechanism from the shaft, thus allowing the shaft to move in both an upward direction and a downward direction.

Another feature of the method may include planting a root ball of a tree within the soil such that a bottom surface of the root ball is above a bottom surface of the network of perforated tubing. For example, installing the network of perforated tubing such that its bottom surface is relatively lower than the bottom surface of the root ball can better ensure that the soil below the root ball is monitored for water saturation.

In another aspect, the systems and techniques disclosed here feature a method for measuring a water percolation rate of a soil.

Implementations may include one or more of the following features.

For example, a method for measuring a water percolation rate of a soil can include installing a network of perforated tubing along a bottom surface of a planting pit housing the soil, installing a vertical pipe with a vertical pipe cap to be associated with the network of perforated tubing, and installing a shaft attached to a bladder within the vertical pipe. The method can also include installing a fastener attached to the shaft, disengaging a retention mechanism within the vertical pipe cap, and watering the soil with a liquid such as water.

Another feature of the method may include watering the soil such that water enters the soil, the perforated tubing network, and the vertical pipe such that a rising water level within the vertical pipe pushes up the bladder and the shaft. Another feature of the method may include observing the shaft rise to an apex watering height from a base height, observing the shaft descend from the apex watering height to the base height, and calculating a percolation rate based on the watering of the soil and the shaft descending from the apex watering height to the base height. Another feature of the method may include measuring a time applicable to the shaft descending from the apex watering height to the base height. Another feature of the method may include measuring a volume of the liquid used for watering the soil.

The percolation rate of the soil is the water infiltration rate of the same. Calculating the percolation rate can better adjust a watering volume, a water rate, and a watering frequency for optimal watering conditions of the soil and the plant. An ideal watering of the soil and the plant can be at a watering rate and a watering volume as high as possible without excess water at the bottom of the planting pit, without excess water at the bottom of a root ball of the plant, or saturation of the soil. For example, the soil can be watered at a watering rate such that the shaft never rises indicating there is little to no excess water within the soil. After a percolation rate of the water through the root ball is calculated, the watering of the soil can be adjusted by reducing the volume of water applied to the soil while maintaining the watering rate, reducing the watering rate whiling maintaining the volume of the water applied to the soil, or reducing both the volume of water applied to the soil and reducing the watering rate. Weather, soil conditions, watering frequency, etc. can impact the percolation rate.

For example, 120 gallons of water are used to water the soil. A water level of the soil indicated by the shaft rising with a push nut on top indicates the water level or water saturation of the soil rising to the apex watering height. The descent of the push nut and the shaft can indicate the water percolation rate. As an example, it takes 8 hours for the push nut and the shaft to descend from the apex watering height to the base height indicated by the push nut finally resting on the vertical pipe cap. The percolation rate can be calculated from the 120 gallons of water applied divided by the 8 hours for the water level to fall after reaching the apex watering height for a water percolation rate of about 15 gallons per hour.

Another feature of the method may include communicating water percolation data to a computer device. For example, the water percolation data can compromise data related the positioning and/or the movement of the shaft. Data related to the positioning and/or the movement of the shaft can be based from multiple types of data or signals such as the shaft or another device completing a circuit, an emitter and transmitter communicating with each other, an infrared feedback, and an actuating device such as a button or a switch.

Another feature of the method may include receiving a weather data based on a global positioning coordinate. Other data can include data related to weather, weather prediction, geography, soil characteristics, water usage rate, and total water used. The computer device can be in communication with a computer network. The computer device can also be in communication with a cloud computer network.

Another feature of the method may include sending a recommendation data to a user computer device based on the water percolation data or the global positioning data. The user computer device can be a personal computer device such as a personal computer, laptop, smartphone, etc. The recommendation data can include warnings or suggestions to the user computer device. For example, the recommendation data can inform of the soil being saturated and in need of draining. In another example, the recommendation data can inform of an incoming storm that may flood the area. In another example, the recommendation can inform of certain conditions that may affect the percolation of the soil. In another example, the recommendation data can inform of changing the watering rate based on certain conditions such as past watering frequency or weather.

DESCRIPTION OF THE DRAWINGS

Figure 1:
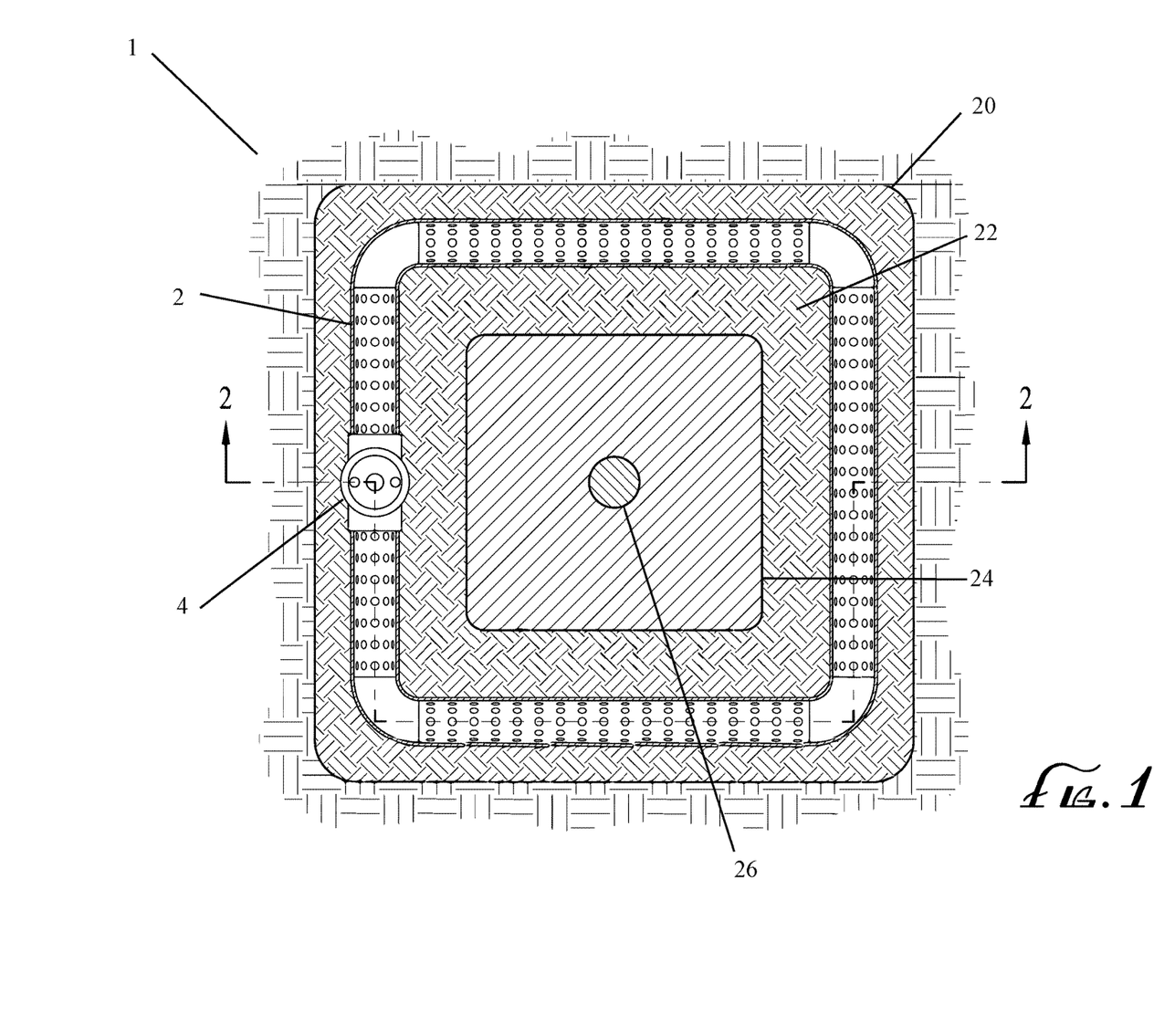
FIG. 1 is a top perspective view of a first embodiment of a Warning System installed in a planting pit.
Figure 2:
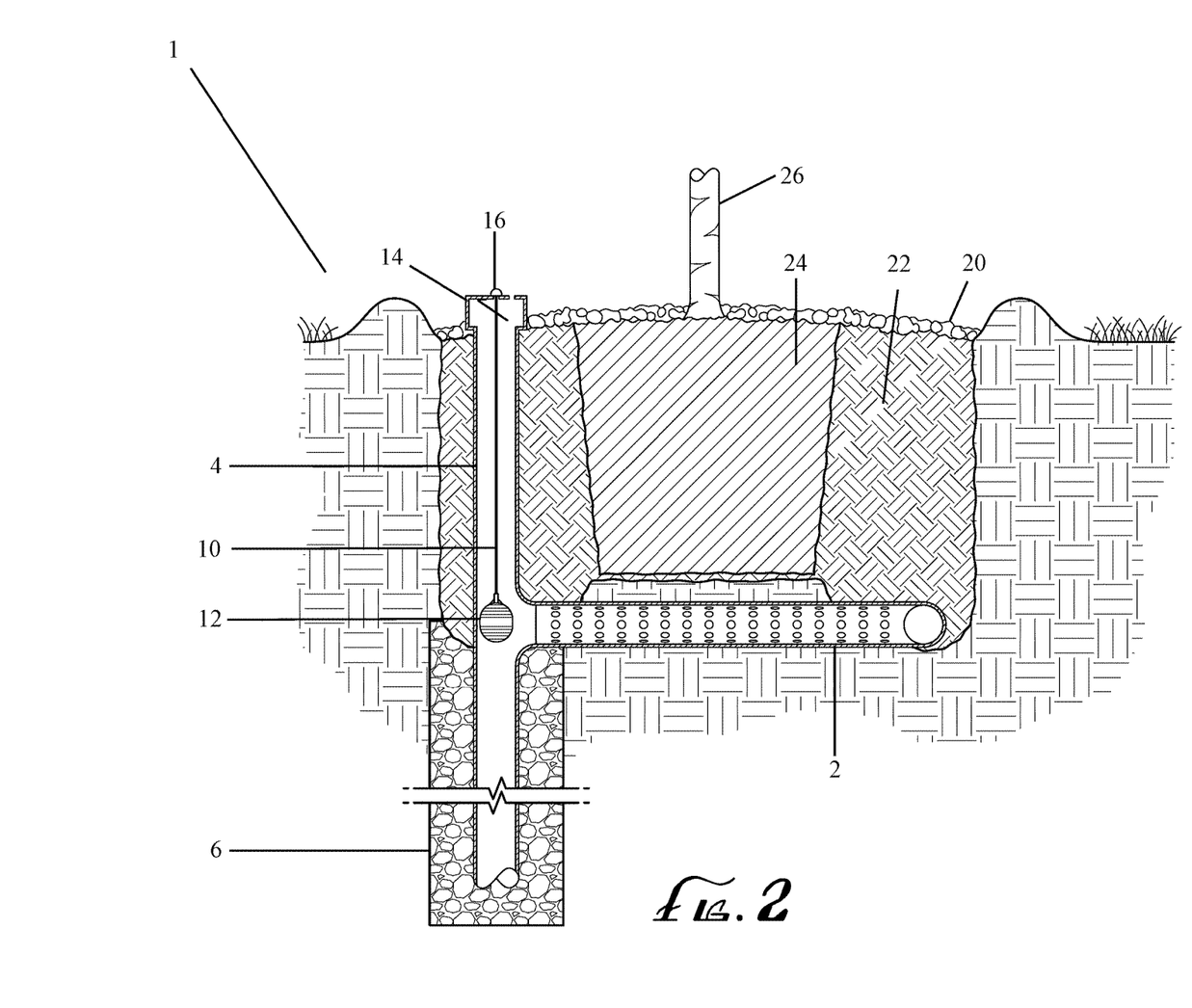
FIG. 2 is a cutaway side perspective view of the Warning System and the planting pit of FIG. 1.

FIGS. 1 and 2 demonstrate a first embodiment of a Warning System 1 from various perspectives.

FIG. 1 demonstrates the Warning System 1 from a top-down perspective. The Warning System 1 is shown comprising of a tubing network 2 and a vertical pipe 4. The tubing network 2 is shown with perforations for receiving liquids such as water. These perforations can be covered by materials such as a mesh sleeve so that only liquids can pass through and solids such as soil and dirt are blocked. The tubing network 2 and the vertical pipe 4 are installed within a planting pit 20. The planting pit 20 is filled with a soil 22. A tree 26 is planted within the planting pit 20. A root ball 24 of the tree 26 is planted within the soil 22 of the planting pit 20. As shown, the soil 22 within the planting pit 20 surrounds the tubing network 2, the vertical pipe 4, and the root ball 24.

FIG. 2 demonstrates the Warning System 1 of FIG. 1 from a cutaway side perspective. The tubing network 2, the vertical pipe 4, and the root ball 24 of the tree 26 are shown within the soil 22 of the planting pit 20. Extending from the vertical pipe 4 is a sump 6. The sump 6 is a reservoir for collecting excess liquids such as water within the soil 22. The tubing network 2, the vertical pipe 4, and the sump 6 (if installed) all collect excess water within the soil 22 of the planting pit 20. Thus, if the soil 22 is saturated, the water can be collected by the tubing network 2, the vertical pipe 4, and the sump 6 instead of remaining in the soil 22 and potentially creating anaerobic soil conditions that can damage the root ball 24 and kill the tree 26. The sump 6 and the vertical pipe 4 are also a centralized area for a user to collect and remove excess water collected by the Warning System 1. The tubing network 2 is installed such that the bottom surface of the tubing network 2 is installed at a height lower than the bottom surface of the root ball 24.

FIG. 2 further demonstrates within the vertical pipe 4 is an installation comprising of a shaft 10, a bladder 12, and a vertical pipe cap 16. The bladder 12 is buoyant and rises as the water level rises within the tubing network 2, the vertical pipe 4, and the sump 6 (if installed as shown). As the bladder 12 moves, the attached shaft 10 moves too. A fastener 16 is attached at the top of the shaft 10 for preventing the shaft 10 from descending below the vertical pipe cap 14. Thus, even when there is no water within the tubing network 2, the vertical pipe 4, and the sump 6, the shaft 10 is supported by the fastener 16 and the top of the shaft 10 remains at the top of the vertical pipe cap 14. A cavity within the vertical pipe cap 14 is fitted such that the cavity is large enough for the shaft 10 to move through the cavity. The cavity is also small enough such that the fastener 16 attached to the shaft 10 does not fit through the cavity and will be stopped by the vertical pipe cap 14.

As shown in FIG. 2, the shaft 10 is fitted such that the length of the shaft 10 is the length from the top of the vertical pipe cap 14 to the resting position of the bladder 12 in conditions in which there is little to no excess water within the Warning System 1. Conditions in which there is little to no excess water within the Warning System 1 exist when the water level within the tubing network 2 and the vertical pipe 4 has not exceeded a 0 water level height. When a sump 6 is installed as shown, the water level exceeds the 0 water level height only after the sump 6 reservoir has been filled. Thus, as the water level in the tubing network 2, vertical pipe 4, and the sump 6 rises beyond a 0 water level height, the shaft 10 and top-attached fastener 16 rise too. Because the length of the shaft 10 has been adjusted for a length from the top of the vertical pipe cap 14 to the resting position of the bladder 12 at a 0 water level height, a rise in the height of the shaft 10 and the fastener 16 beyond the vertical pipe cap 14 indicates excess water within the soil 22.

Figure 3:
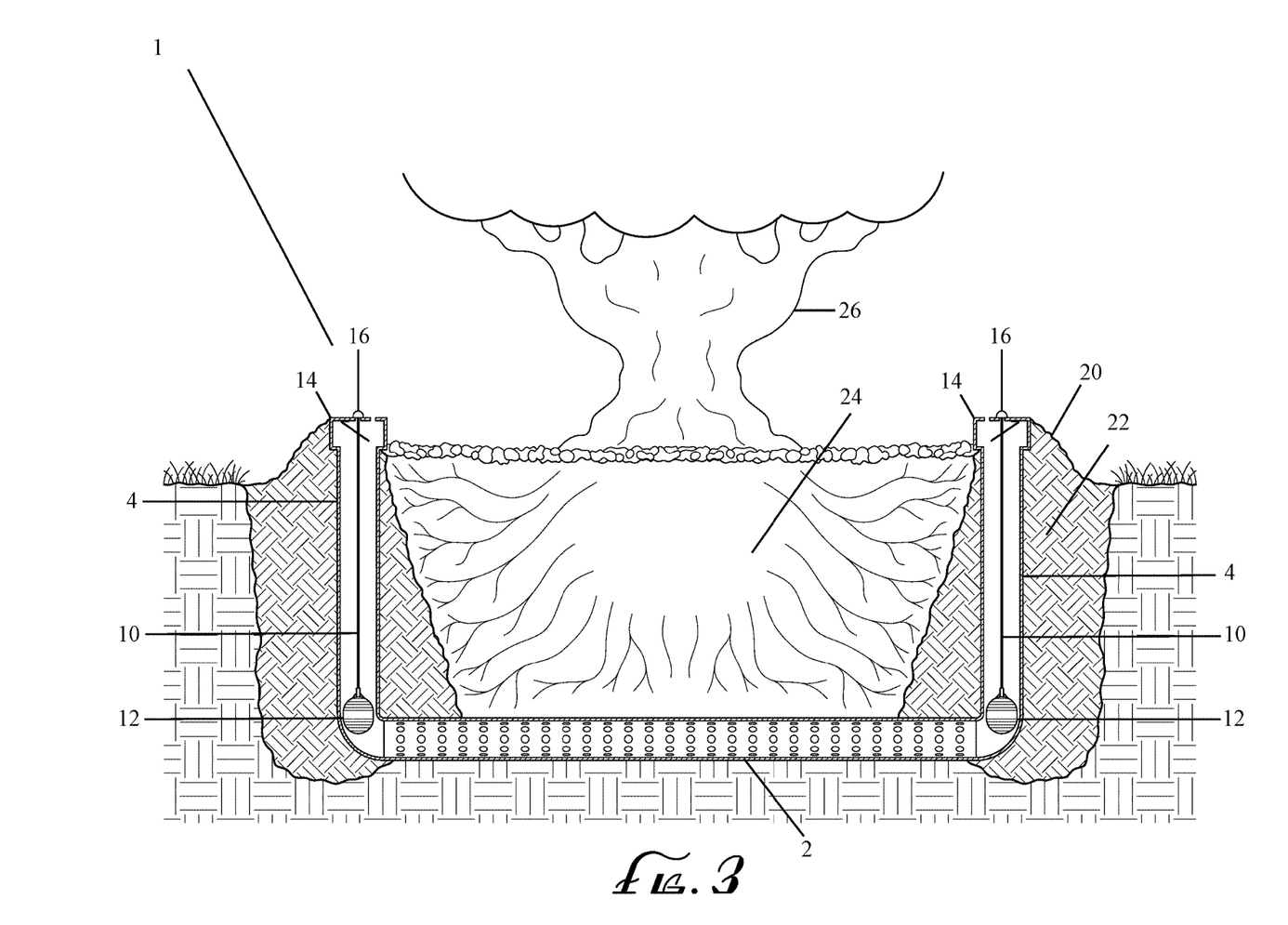
FIG. 3 is a cutaway side perspective of a second embodiment of a Warning System installed in a planting pit.
Figure 4:
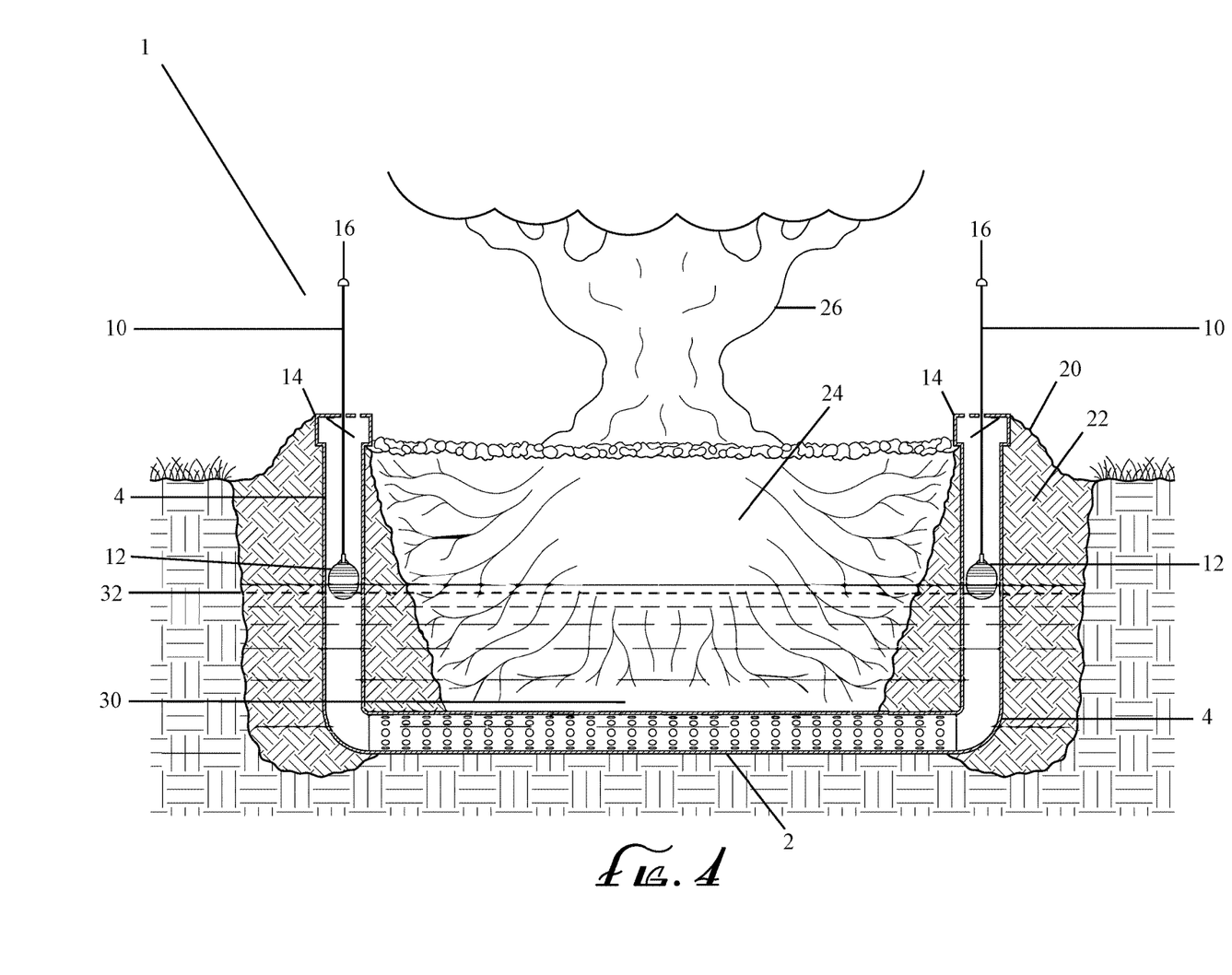
FIG. 4 is a cutaway side perspective of the Warning System and the planting pit of FIG. 3 displaying a soil saturated with water and a raised water level.
Figure 5:
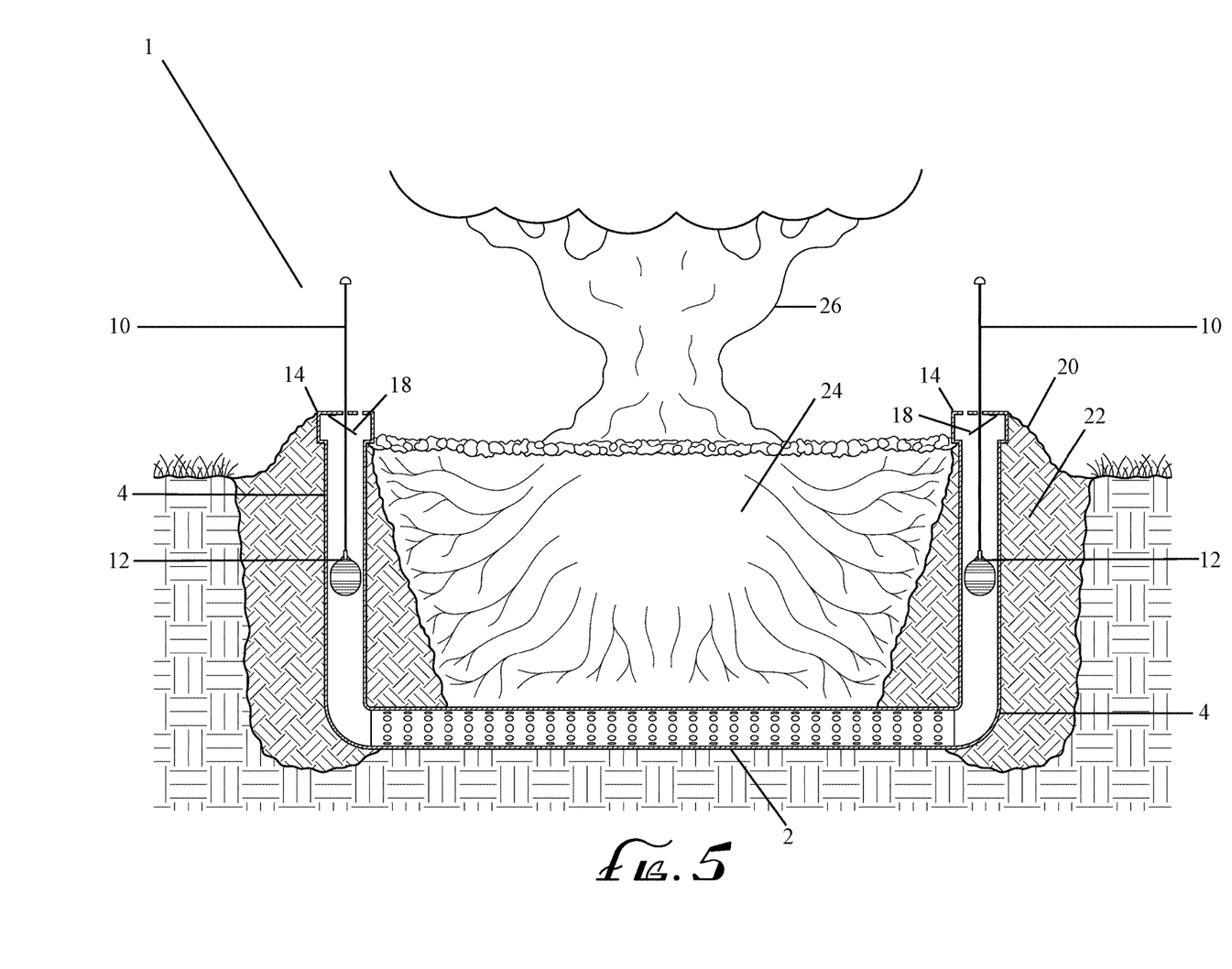
FIG. 5 is a cutaway side perspective of the Warning System and the planting pit of FIG. 3 displaying an unsaturated soil that previously had a raised water level from FIG. 4.

FIGS. 3 through 5 demonstrate a second embodiment of a Warning System 1 from various perspectives.

FIG. 3 demonstrates the Warning System 1 from cutaway side view. The Warning System 1 consisting of a tubing network 2 is shown installed within a planting pit 20 and a soil 22 supporting a root ball 24 of a tree 26. In this demonstrated configuration, there are two vertical pipes 4, two shafts 10, two bladders 12, two vertical pipe caps 14, and two fasteners 16. Unlike the previous embodiment as demonstrated in FIG. 2, no sump 6 is installed.

FIG. 4 demonstrates the Warning System 1 from FIG. 3 after a volume of water 30 has saturated the soil 22. As the water 30 saturates the soil 22, the water 30 enters the tubing network 2 and the vertical pipe 4 and a water level height 32 rises within the Warning System 1. The rising water level height 32 forces up the buoyant bladder 12, which consequently also forces up the shaft 10 and the fastener 16. Thus, the risen height of the shaft 10 and fastener 16 indicates that the water level height 32 has arisen within the planting pit 20 and that the soil 22 has been saturated by the water 30.

FIG. 5 demonstrates the Warning System 1 from FIG. 3 after the water 30 that saturated the soil 22 has passed and the water level height 32 has pushed up the shaft 10 and the bladder 12 as demonstrated in FIG. 4. Here, the Warning System 1 has been set in a historical mode. In this historical mode, a retention mechanism 18 has been engaged with the shaft 10. Thus, the shaft 10 can move in an upwards direction through the vertical pipe cap 14 and its corresponding cavity, but the retention mechanism 18 prevents the shaft 10 from moving in a downwards direction. Thus, even if there is no water in the planting pit 20, the soil 22, the vertical pipes 4, or the tubing network 2, the shaft 10 and the bladder 12 remain at the height pushed up by the water level height 32 from FIG. 4. Hence, the Warning System 1 indicates in this historical mode that the soil 22 has been saturated with water at some point in the past since the last time the shaft 10 and the bladder 12 were reset.

Figure 6:
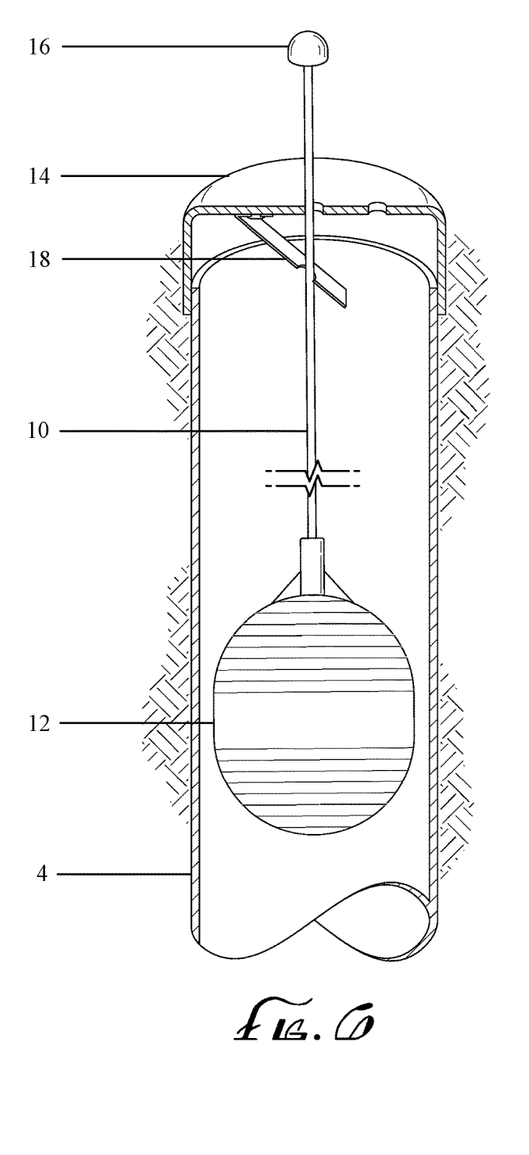
FIG. 6 is a cutaway side perspective of a vertical pipe with a retention mechanism engaged with a shaft.
Figure 7:
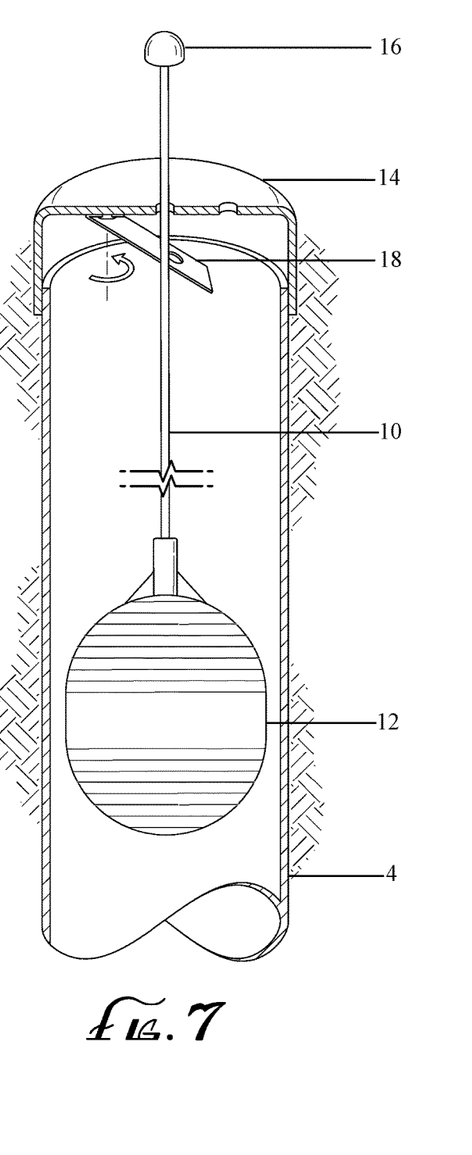
FIG. 7 is a cutaway side perspective of the vertical pipe of FIG. 6 with a retention mechanism disengaged from the shaft.

FIGS. 6 through 7 demonstrate a retention mechanism 18 being engaged and disengaged with a shaft 10 within a vertical pipe 4.

FIGS. 6 and 7 demonstrate the vertical pipe 4 housing the shaft 10 attached to a bladder 12 and a fastener 16. The shaft 10 goes through a cavity within a vertical pipe cap 14. Another cavity displayed within the vertical pipe cap 14 allows pressure within the vertical pipe 4 (e.g., air pressure) to equalize as liquids and other materials enter the vertical pipe 4. In FIG. 6, the retention mechanism 18 is positioned such that it is engaged with the shaft 10. The shaft 10 is positioned though a cavity within the retention mechanism 18. The retention mechanism allows the shaft 10 to move in an upwards vertical direction but prevents the shaft 10 from moving in a downwards vertical direction. Thus, a rising water level within the vertical pipe 4 can raise the bladder 12 and the shaft 10, but after the water has passed, the shaft 10 remains at its risen height. Hence, engaging the retention mechanism 18 with the shaft 10 enters the Warning System 1 into a historical mode in which the historically highest water level within the planting pit 20 and the soil 22 is displayed by the shaft 10.

In FIG. 7, the retention mechanism 18 is shown disengaged from the shaft 10. As shown in FIG. 7, the retention mechanism 18 is rotated such that the shaft 10 is not positioned through the retention mechanism 18 while still being positioned through the cavity of the vertical pipe cap 14. Thus, a rising water level within the vertical pipe 4 can raise the bladder 12 and the shaft 10. As the water level drops, the shaft 10 will move back down with the falling water level until the fastener 16 prevents the shaft 10 from moving downwards any farther. Hence, disengaging the retention mechanism 18 from the shaft 10 enters the Warning System 1 into a real-time mode in which the real-time water level within the planting pit 20 and the soil 22 is displayed by the shaft 10.

I claim:

1. A water monitoring system for monitoring water saturation in a planting pit of a soil, said water monitoring system comprising:
   a horizontal perforated tubing disposed along a bottom surface of the planting pit housing said soil;
   a solid vertical pipe open to said perforated tubing, the vertical pipe adjacent a sidewall of the planting pit;
   the vertical pipe having an above-ground pipe cap, and an open bottom;
   a bladder housed within said vertical pipe, said bladder being buoyant;
   a shaft attached to said bladder;
   a fastener disposed on the shaft above the pipe cap for indicating the position of the bladder in the vertical pipe; and,
   a releasable maximum level retention mechanism for controlling a vertical movement of said shaft configured to allow the shaft to rise relative to the vertical pipe and prevent the shaft moving downwards relative to the vertical pipe;
   whereby said bladder is configured within said vertical pipe such that said bladder floats on top of a surface of a water collected by said network of perforated tubing from said soil; and,
   whereby said shaft attached to said bladder visually indicates a maximum water level height of said water by moving with said bladder floating on top of said surface.

2. The water monitoring system according to claim 1, further comprising a sump under the open bottom of said vertical pipe.

3. The water monitoring system according to claim 1, wherein said fastener is a nut attached to a top end of said shaft.

4. The water monitoring system according to claim 1, wherein a root ball is planted within said soil; and,
   wherein a bottom of said network of perforated tubing is a below a bottom of said root ball.

5. The water monitoring system according to claim 1, further comprising a meshed surface covering said network of perforated tubing.

6. The water monitoring system according to claim 1, wherein said retention mechanism includes a spring and a retention clip.

\* \* \* \* \*